United States Patent Office 3,321,975
Patented May 30, 1967

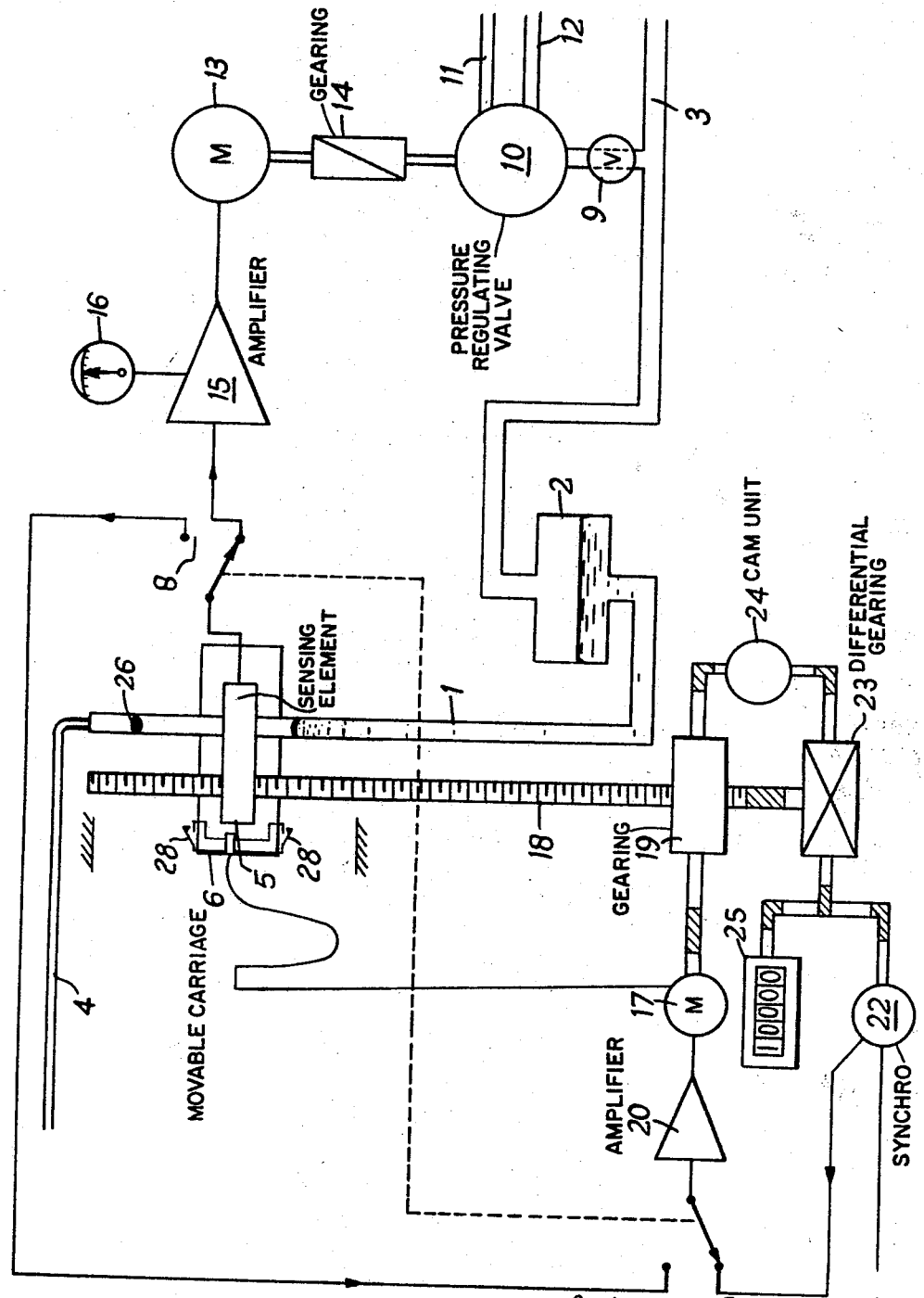

3,321,975
APPARATUS FOR CONTROLLING OR
MEASURING FLUID PRESSURES
John Francis Anthony Parkes, Cambridge, and Gerald Radford, Chatham, Kent, England, assignors to Elliott Brothers (London) Limited, London, England
Filed May 7, 1964, Ser. No. 365,651
Claims priority, application Great Britain, May 13, 1963, 18,937/63
5 Claims. (Cl. 73—401)

This invention relates to apparatus for controlling or measuring fluid pressure, particularly gas and vapour pressures.

According to the invention there is provided apparatus for controlling or measuring fluid pressures comprising a liquid column responsive to an applied fluid pressure, a sensing element, drive means for positioning the sensing element with respect to the liquid column, the sensing element being operable to produce a first error signal corresponding to any difference between the position of said element and one end of the liquid column, a first servo loop actuated by the first error signal and including a pressure regulating element effective to adjust the pressure so as to reduce the first error signal, a second servo loop including means responsive to any difference between a preselected fluid pressure and a pressure corresponding to the actual position of the sensing element for producing a second error signal corresponding to such difference, and means responsive to the second error signal to actuate said drive means so as to position the sensing element to reduce the second error signal. The provision of a second servo loop in which error signals are derived and applied to actuate said drive means renders the apparatus particularly suitable for alternatively providing pressure measuring equipment. To this end, in a preferred embodiment of the invention, there is provided an indicator for indicating the position of the sensing element, there being further provided switch means for isolating said first and second servo loops and instead coupling said sensing element to said drive means for applying said first error signal to actuate said drive means so as to position the sensing element to reduce the first error signal.

Furthermore, the apparatus lends itself to the simple provision of means for correcting non-linearity in the manometer system. To this end said means responsive to the pressure difference may comprise differential gearing having a first input coupled to be moved by the drive means, a second input coupled to an adjustable cam rotatable with said drive means, and an output coupled to an angle sensing device, the device being thereby moved jointly by the drive means and the adjustable cam; means for applying to the angle sensing device an electrical signal corresponding to the preselected fluid pressure; and means for deriving from the angle sensing device said second error signal, being an electrical signal corresponding to the actual difference between the preselected fluid pressure and a pressure corresponding to the actual position of the sensing element, the cam being shaped so as to compensate for any departure from linearity in the relationship between the actual fluid pressure and the height of the liquid column. The angle sensing device may be a synchro.

Preferably the sensing element is carried by a carriage which is movable with respect to one end of the liquid column, the carriage having limit switches which are operable when the carriage approaches either end of its travel to reverse the direction of movement of the carriage.

The sensing element is preferably of the form of apparatus described in our co-pending patent application No. 16,046/63.

One embodiment of the invention will now be described with reference to the accompanying drawing, which is a schematic circuit diagram of one form of the apparatus.

Referring to the drawing, the apparatus includes a pressure responsive device in the form of a mercury column 1, the bulb 2 of which is connected to the source of pressure 3 to be controlled or measured, and the upper end of which is connected via a lead 4 to a vacuum or reference source. The height of the meniscus of the mercury column 1 is compared with the position of a movable carriage 6 on which the sensing element 5 is mounted in the manner described in patent application No. 16,046/63, and in accordance with any difference therebetween an error signal is produced, which is switched selectively into one or other of two servo loops by a switch 8, according to the kind of operation to be performed.

The first servo loop includes a two-position valve 9, and a pressure regulating valve 10 for regulating the pressure at the source 3, the valve 10 being connected by a pipe 11 to a negative pressure source and by a pipe 12 to a positive pressure source. The valve 10 is actuated by a motor 13 through gearing 14, and the motor is actuated in accordance with a control signal from an amplifier 15 to which the error signal is fed by way of the selector switch 8. A meter 16 is connected to an output of the amplifier 15, and a zero reading on this meter indicates that the servo loop has reduced the error signal to zero.

The second servo loop includes a motor 17 which drives a lead screw 18 through gearing 19 so as to position the carriage 6 with respect to the mercury column. The motor 17 is actuated by a control signal from an amplifier 20, to which the error signal is applied when the switch 8 is in its second position.

In order to operate the apparatus as a pressure source an angle representing the required pressure is transmitted from external equipment by means of an angle sensing element such as a synchro, and this angle is compared with the rotor angle of a synchro 22 connected to the lead screw 18 through the gearing 19 and a differential gearbox 23. A voltage signal representing the difference between these two angles is amplified by the amplifier 20 (when the switch 8 is in the position shown), and fed to the motor 17 which drives the synchro in such a sense as to reduce the angular difference.

Owing to the small errors inherent in all barometers the theoretical position of the sensing element 5 may not be the actual position corresponding to the required pressure. Once these errors are known, however, they can be eliminated by means of an adjustable cam unit 24 introducing equal and opposite corrections and placed in the drive from the lead screw to the synchro 22. This subsidiary drive, and the main drive from the lead screw, are added in the differential gearbox 23, and thus a relatively coarse adjustment of the cam unit gives a small and precise correction to the overall drive.

Limit switches are provided on the carriage. These switches operate at either end of the vertical travel of the carriage 6 to produce a control signal which actuates the motor 17 so as to drive the carriage away from the end stop.

The sensing element 5 having been accurately positioned according to the required pressure, a voltage error signal representing the difference in height between the element and the mercury meniscus is fed from the sensing element to the amplifier 15, the switch 8 being in the position shown. In accordance with the amplified signal the motor 13 actuates the valve 10 to increase or reduce the pressure at the source 3 so as to reduce the error.

Means may be provided for altering the rate of adjustment of the pressure control valve 10 to save time when large adjustments are needed, or to obtain greater sensitivity in the case of small adjustments.

In order to operate the apparatus for pressure measurement, the pressure to be measured is admitted to the bulb 2 of the mercury column, the selector switch 8 having been switched to its second position and the valve 9 being closed. The error signal corresponding to any difference in height between the sensing element and mercury meniscus is now switched into the second servo loop and the motor 17 is actuated so as to bring the sensing element into a position corresponding to the actual gas or vapour pressure to be measured. This pressure thus determines the angle at which the lead screw 18 comes to rest and this can be read on a decade counter 25, with any necessary corrections made by the cam unit 24 incorporated.

In order to calibrate the apparatus for use as a pressure source, the reading of the counter 25 can simply be checked against the demanded pressure. To calibrate the apparatus for use as a measuring device, the lower limit switch on the carriage 6 is operated manually to drive the carriage to the top of the barometer tube, whereby the sensing element 5 is positioned with respect to a dummy meniscus 26 at the top of the tube 1. For a given temperature correction the pressure represented by this dummy meniscus is known and when the counter reads this value, correct operation of the apparatus is verified.

For either mode of operation, the mercury meniscus may be sighted visually with a sighting ring mounted on the carriage; in the steady state the visual sighting will always show coincidence. The carriage position can be read against a vernier scale, and the scale reading, when corrected, should agree with the reading on the counter 25.

It will be appreciated that the apparatus may be used, if required, to produce or measure a difference of pressures, by connecting the lead 4 to one of these pressures to be used as a reference, or alternatively the top of the column may be sealed off under vacuum.

We claim:

1. Apparatus for controlling and measuring liquid pressures comprising a liquid column responsive to an applied fluid pressure, a sensing element, drive means for positioning the sensing element with respect to the liquid column, the sensing element being operable to produce a first error signal corresponding to any difference between the position of said element and one end of the liquid column, a first servo loop actuated by the first error signal and including a pressure regulating element effective to adjust the pressure so as to reduce the first error signal, a second servo loop including means responsive to any difference between a preselected fluid pressure and a pressure corresponding to the actual position of the sensing element for producing a second error signal corresponding to such difference, and means responsive to the second error signal to actuate said drive means so as to position the sensing element to reduce the second error signal.

2. Apparatus as claimed in claim 1 wherein an indicator is provided for indicating the position of the sensing element, there being further provided switch means for isolating said first and second servo loops and instead coupling said sensing element to said drive means for applying said first error signal to actuate said drive means so as to position the sensing element to reduce the first error signal.

3. Apparatus according to claim 1, wherein said means responsive to the pressure difference comprise differential gearing having a first input coupled to be moved by the drive means, a second input coupled to an adjustable cam rotatable with said drive means, and an output coupled to an angle sensing device, the device being thereby moved jointly by the drive means and the adjustable cam; means for applying to the angle sensing device an electrical signal corresponding to the preselected fluid pressure; and means for deriving said second error signal from the angle sensing device, said second error signal being an electrical signal corresponding to the actual difference between the preselected fluid pressure and a pressure corresponding to the actual position of the sensing element, the cam being shaped so as to compensate for any departure from linearity in the relationship between the actual fluid pressure and the height of the liquid column.

4. Apparatus according to claim 3, wherein the angle sensing device is a synchro.

5. Apparatus according to claim 1, wherein the sensing element is carried by a carriage which is movable with respect to one end of the liquid column, the carriage having limit switches which are operable when the carriage approaches either end of its travel to reverse the direction of movement of the carriage.

References Cited

UNITED STATES PATENTS

| | | | |
|---|---|---|---|
| 2,376,459 | 5/1945 | Stevens. | |
| 2,701,854 | 2/1955 | Carrick | 73—401 |
| 2,722,641 | 11/1955 | Cross | 73—401 |
| 2,818,726 | 1/1958 | Amonette et al. | |
| 2,841,011 | 7/1958 | Mayes et al. | 73—401 |
| 3,134,262 | 5/1964 | Oworzan et al. | 73—401 |
| 3,225,599 | 12/1965 | Schwien | 73—401 |

LOUIS R. PRINCE, *Primary Examiner.*

D. O. WOODIEL, *Assistant Examiner.*